(12) United States Patent
Hoy et al.

(10) Patent No.: US 8,466,226 B2
(45) Date of Patent: *Jun. 18, 2013

(54) ADHESIVES FOR ELASTOMERS

(75) Inventors: Dean Edward Hoy, West Alexandria, OH (US); James Patrick Weir, Miamisburg, OH (US); Lipa Leon Roitman, Netanya (IL)

(73) Assignee: Rohm and Haas Company, Philadelphia, PA (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/981,898

(22) Filed: Nov. 1, 2007

(65) Prior Publication Data

US 2008/0114111 A1 May 15, 2008

Related U.S. Application Data

(60) Provisional application No. 60/859,147, filed on Nov. 15, 2006.

(51) Int. Cl.
*C08F 236/16* (2006.01)

(52) U.S. Cl.
USPC ........... 524/527; 524/186; 524/464; 524/466; 524/468; 524/469; 524/473; 524/501; 524/519; 525/194; 525/195; 525/196; 525/212; 525/328.5; 525/330.8; 525/330.9; 525/331.1; 525/331.4; 525/332.5; 525/377; 525/383

(58) Field of Classification Search
USPC ................. 524/804, 186, 464, 466, 468, 469, 524/473, 501, 519, 527; 525/194, 195, 196, 525/212, 328.5, 330.8, 330.9, 331.1, 331.4, 525/332.5, 377, 383
See application file for complete search history.

(56) References Cited

U.S. PATENT DOCUMENTS

| | | | |
|---|---|---|---|
| 3,657,046 A | 4/1972 | Furukawa et al. | |
| 3,708,379 A | 1/1973 | Flint | |
| 3,826,772 A | 7/1974 | Gebhard et al. | |
| 4,308,365 A | 12/1981 | Czerwinski | |
| 4,881,996 A | 11/1989 | Nussbaum et al. | |
| 4,988,753 A | 1/1991 | Rullmann | |
| 5,028,654 A | 7/1991 | Wuest | |
| 5,281,638 A * | 1/1994 | Mowrey | 524/105 |
| 5,717,031 A * | 2/1998 | Degen et al. | 525/129 |
| 6,268,422 B1 | 7/2001 | Weih | |
| 2004/0176533 A1 | 9/2004 | Kucera et al. | |

FOREIGN PATENT DOCUMENTS

| | | |
|---|---|---|
| GB | 877923 | 9/1961 |
| JP | 62000571 | 1/1987 |
| JP | 2001260235 | 9/2001 |
| JP | 2006-156683 | 6/2006 |

OTHER PUBLICATIONS

Rehner et al., "Vulcanization Reactions in Butyl Rubber", Industrial and Engineering Chemistry 1946, 38(5), 500-506.*
Gowenlock, B. G. and Richter-Addo, G. B., "Dinitroso and polynitroso compounds", Chem. Soc. Rev. 2005, 34(9), 797-809.*
L.M. Gan, et al., "Vulcanization of Butyl Rubber by pQuinne Dioxime," Journ. Appl. Polym. Sci., v. 21, No. 7, pp. 1771-1781, 1997.
R. Rathore, et. al. "Catalytic Autoxidationof Benzoquinone Dioximes with Nitrogen Oxides: Steric Effects . . . ", J. Chem. Soc. Perkin Trans. 1, vol. 19, pp. 2675-2684, 1994.
J. Rehner, et. al. "Vulcanization Reactions in butyl Rubber", Rubber Chem and Technol., vol. 19, pp. 960-914, 1946.
ExxonMobil, "Model Vulcankation Systems for Butyl Rubber, Halobutyl Rubber, and BIMSM Elastomer," 2006.

* cited by examiner

*Primary Examiner* — Richard A Huhn
(74) *Attorney, Agent, or Firm* — Carl P. Hemenway

(57) ABSTRACT

There is provided an adhesive composition comprising
(i) at least one film forming polymer,
(ii) at least one crosslinker selected from the group consisting of polynitroso compounds, polynitroso precursors, and mixtures thereof, and
(iii) at least one oxidizer, wherein the molar ratio of oxidizer to crosslinker is from 0.3 to 2.0.
Also provided is a method of bonding substrates together using such a composition, and an article made using such a method.

16 Claims, No Drawings

ADHESIVES FOR ELASTOMERS

This application claims the benefit of priority under 35 U.S.C. §119(e) of U.S. Provisional Patent Application No. 60/859,147 filed on Nov. 15, 2006.

BACKGROUND

One useful class of materials is elastomer-bonding compositions (i.e., compositions that are capable of bonding to elastomer substrates). Some elastomer-bonding compositions contain crosslinkers that are polynitroso compounds, polynitroso precursors, or mixtures thereof. For example, U.S. Pat. No. 4,308,365 discloses a reactive adhesive that contains an ionomer resin and either a poly-C-nitroso compound or ingredients that result in in-situ formation of a poly-C-nitroso compound.

However, such crosslinkers are known to present several undesirable characteristics. For example, many of such crosslinkers are volatile at the conditions at which the elastomer bonding composition is cured, and that volatility can lead problems such as, for example, fuming and/or mold fouling. Also, many of such crosslinkers are undesirably expensive and/or toxic. It is desired to provide adhesive compositions that provide good adhesive performance with lower levels of crosslinker.

STATEMENT OF THE INVENTION

In one aspect of the present invention, there is provided an adhesive composition comprising
(i) at least one film forming polymer,
(ii) at least one crosslinker selected from the group consisting of polynitroso compounds, polynitroso precursors, and mixtures thereof, and
(iii) at least one oxidizer, wherein the molar ratio of oxidizer to crosslinker is from 0.3 to 2.0.

DETAILED DESCRIPTION

In some embodiments, the composition of the present invention is dissolved or dispersed in an organic solvent.

In some embodiments, the composition of the present invention is a waterborne composition. A waterborne composition is a composition that contains water and other ingredients. In a waterborne composition, the ingredients other than water are dissolved in the water or dispersed in the water or a combination thereof. A specific ingredient other than water may be dissolved in the water or dispersed in the water or a combination thereof. If two or more ingredients other than water are present, there may be any combination of dissolved ingredients or dispersed ingredients or combination thereof. For example, if any two ingredients other than water are considered, both ingredients other than water may be dispersed; or one ingredient other than water may be dissolved while the other ingredient other than water may be dispersed; or one ingredient other than water may be both dissolved and dispersed while the other ingredient other than water may be dissolved or dispersed or both dissolved and dispersed.

An ingredient that is dispersed in water is in the form of discrete particles distributed throughout the water. The distribution of particles in water may be in any form, such as, for example, a dispersion, a suspension, an emulsion, a latex, or a combination thereof. The discrete particles may be solid, liquid, or a combination thereof. Independently, the discrete particles may form a colloid or other form of distribution.

In some embodiments, the practice of the present invention involves contacting a layer of an adhesive composition with an elastomer substrate. The elastomer substrate used in the practice of the present invention may be any of a wide variety of elastic materials. Elastomers are well known in the art. One description can be found in *Textbook of Polymer Science*, second edition, by F. W. Billmeyer Jr., Wiley-Interscience, 1971. As described by Billmeyer, elastomers are materials that stretch under tension to a new length that is generally at least 1.1 times their original length and may be many times their original length; they exhibit relatively high strength and stiffness when stretched; after deformation, they tend to recover their original shapes relatively quickly, with relatively little residual permanent deformation. For purposes of the present invention, materials exhibiting most or all of these characteristics will be considered "elastomers." Elastomers can be made from a wide variety of materials, such as for example natural rubber and synthetic rubber. Synthetic rubbers include, for example, polybutadiene, neoprene, butyl rubber, polyisoprene, nitrile rubbers, styrene butadiene rubbers (also called SBRs), ethylene propylene diene based rubbers (some of which are called EPDM), and the like. Elastomers include both thermoplastic elastomers (also called elastoplastics or melt-processable rubbers) and crosslinked (also called vulcanized) elastomers. The present invention may be practiced to bond any elastomer. Preferred elastomers are crosslinked synthetic or natural rubbers; more preferred are crosslinked elastomers made using natural rubber.

The adhesive compositions of the present invention may be used to bond elastomers to any of a wide variety of useful materials, including for example other elastomers; non-elastomeric but flexible materials such as for example fabrics or films; and rigid materials such as plastics, engineering plastics, wood, and metal. Some compositions of the present invention work well at bonding elastomers to metal.

The present invention involves the use of a film-forming polymer. A film-forming polymer is a polymer that forms a film when a layer of that polymer is applied to a substrate. Typically, a layer of either a polymer solution in organic solvent or a waterborne composition containing a polymer is applied to a substrate, and the layer is dried, either at room temperature (25° C.) or at elevated temperature (i.e., above 25° C., usually 100° C. or lower). It is contemplated that a film-forming polymer will form a film under such drying conditions.

A wide variety of types of film forming polymers, as discussed in detail below, are suitable. It is contemplated that the composition of the present invention may contain one or more film forming polymer from just one type; or the composition of the present invention or may contain one or more film forming polymer from one type mixed with one or more film forming polymer from one or more other type.

One suitable type of film-forming polymer is, for example, polymer that has one or more groups capable of chemically reacting with a nitroso group. Some suitable film-forming polymers, for example, contain at least one carbon-carbon double bond.

One suitable type of film-forming polymer is, for example, olefin polymer, which may be substituted or unsubstituted or a mixture thereof. Olefin polymers, also called polyolefins, include polymers based on monomer molecules that are unsaturated aliphatic hydrocarbons containing one double bond per molecule. Examples of such olefin polymers are polyethylene, polypropylene, polyisobutene, polybut-1-ene, poly-4-methylpent-1-ene, and the various copolymers thereof. Also included in the class of olefin polymers are polymers based on natural rubber and polymers based on synthetic rubber such as for example polyisoprene; polybutadiene; polymers of adducts of butadiene and cyclic conjugated dienes; copolymers of butadiene and styrene; copolymers of ethylene, propylene, and dienes; copolymers of acrylonitrile and butadiene; and the various copolymers thereof. Also included in the class of olefin polymers are the polymers described above that also include one or more multiply functional monomers to provide crosslinking.

One suitable type of olefin polymer is, for example, halogenated olefin polymer. Halogenated olefin polymers have structures that are the same as those of unsubstituted polyolefins except that halogen atoms replace one or more of the hydrogen atoms. The halogens may be chlorine, bromine, fluorine, or a mixture thereof. The preferred halogens are chlorine, bromine, and mixtures thereof. The amount of halogen does not appear critical and can range from 3 to 70 percent by weight of the polymer.

Independently, in some embodiments, a halogenated olefin polymer is used that is a substituted polydiene polymer (i.e., a polymer that has the structure of a polydiene polymer in which halogen atoms are substituted for some hydrogen atoms). Suitable polydiene polymers include, for example, polybutadiene, polyisoprene, and mixtures thereof. Some suitable polydiene polymers have no monomer units that are not residues of diene molecules. In some embodiments, every halogenated olefin polymer in the adhesive composition is a substituted polydiene polymer in which no monomer units are other than residues of diene molecules.

One suitable type of halogenated olefin polymer is bromine substituted olefin polymer, which is a halogenated olefin polymer in which at least one halogen is bromine. A bromine substituted olefin polymer may or may not contain atoms of halogens other than bromine.

One suitable type of halogenated olefin polymers is chlorine substituted olefin polymer, which is a halogenated olefin polymer in which at least one halogen is chlorine. A chlorine substituted olefin polymer may or may not contain atoms of halogens other than chlorine. One specific type of chlorine substituted olefin polymer is chlorinated polyolefin, which is an olefin polymer in which all the substituents are chlorine. One suitable chlorinated polyolefin, for example, is chlorinated polyethylene (CPE).

One suitable type of halogenated olefin polymer is mixed-halogen substituted olefin polymer, which is a halogenated olefin polymer that has two or more different types of halogen atoms. In some embodiments, a mixed-halogen substituted olefin polymer is used that has chlorine and bromine. One suitable mixed-halogen substituted olefin polymer, for example, is brominated polydichlorobutadiene ("BPDCD").

In some embodiments, at least one halogenated olefin polymer is used that has no substituent on the olefin polymer selected from nitrile, carboxyl, carboxylate ester, ether, peroxyester, or combination thereof. In some embodiments, every halogenated olefin polymer has no substituent on the olefin polymer selected from nitrile, carboxyl, carboxylate ester, ether, peroxyester, or combination thereof. In some embodiments, at least one halogenated olefin polymer is used that has no substituent on the olefin polymer other than halogen. In some embodiments, every halogenated olefin polymer in the adhesive composition has no substituent on the olefin polymer other than halogen.

One suitable type of film forming polymer is halosulfonated olefin polymer, which is polymer that has the structure of unsubstituted olefin polymer in which some hydrogen atoms are replaced by halogen atoms and in which some other hydrogen atoms are replaced by sulfonyl halide groups, which have the chemical formula SO2X, where X is a halogen atom. The halogens in the sulfonyl halide groups may be chlorine, bromine, fluorine, or a mixture thereof. In some embodiments, the halogens in the sulfonyl halide groups are chlorine, bromine, or a mixture thereof. In some embodiments, the halogen in the sulfonyl halide groups is chlorine. In some embodiments, every halogen in every sulfonyl halide group every halosulfonated olefin polymer is either chlorine or bromine. In some embodiments, every halogen in every sulfonyl halide group every halosulfonated olefin polymer in the adhesive composition is chlorine.

Independently, in some embodiments, a halosulfonated olefin polymer is used that is a substituted EP polymer (i.e., a polymer that has the structure of an EP polymer in which sulfonyl halide groups are substituted for some hydrogen atoms). An EP polymer is a polymer that has 50 mole % or more of its monomer units chosen from ethylene or propylene or a mixture thereof. In some embodiments, every halosulfonated olefin polymer in the adhesive composition is a substituted EP polymer. Some suitable EP polymers are, for example, polyethylene, polypropylene, copolymers of ethylene and propylene, copolymers of ethylene and propylene and one or more diene monomer, and mixtures thereof. Some suitable halosulfonated olefin polymers include, for example, chlorosulfonated polyethylene (CSPE), chlorosulfonated polypropylene, bromosulfonated polyethylene, bromosulfonated polypropylene, and mixtures thereof. In some embodiments, every halosulfonated olefin polymer in the adhesive composition is selected from (CSPE), chlorosulfonated polypropylene, bromosulfonated polyethylene, bromosulfonated polypropylene, and mixtures thereof. In some embodiments, every halosulfonated olefin polymer in the adhesive composition is CSPE.

In some embodiments, at least one halosulfonated olefin polymer is used that has no substituent on the polyolefin selected from nitrile, carboxyl, carboxylate ester, ether, peroxyester, or combination thereof. In some embodiments, every halosulfonated olefin polymer in the adhesive composition has no substituent on the polyolefin selected from nitrile, carboxyl, carboxylate ester, ether, peroxyester, or combination thereof. In some embodiments, at least one halosulfonated olefin polymer is used that has no substituent on the polyolefin other than halogen and halosulfonyl group. In some embodiments, every halosulfonated olefin polymer in the adhesive composition has no substituent on the polyolefin other than halogen and halosulfonyl group.

As used herein, a "significant amount" of an ingredient is an amount that has an effect on the performance of the composition. In some embodiments, an ingredient that is a polymer or a resin is considered to be present in a significant amount if the ratio of the dry weight of that ingredient to the sum of the dry weights of polymer (a) and polymer (b) is 0.005 or lower.

Among embodiments in which more than one film forming polymer is used, each film forming polymer, independently of each other, may be made by any method. A variety of methods are known in the art. For example, for making halogenated olefin polymers and/or halosulfonated olefin polymers, the halogen atoms and/or sulfonyl halide groups may be present on a monomer before polymerization; they may be put onto the polymer after polymerization; or both methods may be used.

Among embodiments in which more than one film forming polymer is used, each film forming polymer, independently of each other, can be prepared by any of a variety of methods known in the art. The method of preparation is not critical to the present invention. For example, when a waterborne composition is desired, any film forming polymer can be either made in an aqueous form or else made in some convenient form and then converted to aqueous form. In some embodiments, a film forming polymer is made by aqueous emulsion polymerization of one or more ethylenically unsaturated monomer; the resulting polymer may, for example, be stabilized with polyvinyl alcohol, with one or more non-polymeric surfactants, or with a combination thereof.

In some embodiments, one or more film forming polymer is prepared as a solution in organic solvent. In such embodiments, the film forming polymer may be made by solution polymerization and used in that solution, optionally with further dilution, or may be made by any method, isolated, and then dissolved in organic solvent as desired. In embodiments in which one or more film forming polymer is in the form of a solution in an organic solvent, such a solution, if desired, may then be converted to an aqueous latex. One method of converting an organic solution of a polymer to a latex is to add surfactant and water to the solution with high shear to emulsify the polymer and then strip away the solvent.

In some embodiments, at least one film forming polymer is polymerized by methods other than aqueous emulsion polymerization. In some embodiments, every film forming polymer in the adhesive composition is polymerized by methods other than aqueous emulsion polymerization.

In some embodiments, the practice of the present invention involves the use of a non-olefin polymer selected from epoxy resins, phenolic resins, and mixtures thereof. In some embodiments, one or more non-olefin polymer is used that is insoluble in water. A compound is insoluble in water if less than 1 gram of that compound will dissolve in 100 grams of water at 25° C. In some embodiments, at least one non-olefin polymer is used that has solubility in 100 grams of water at 25° C. of 0.3 gram or less; or 0.1 gram or less; or 0.03 gram or less. In some embodiments, every phenolic resin (if any) in the adhesive composition and every epoxy resin (if any) in the adhesive composition is insoluble in water.

Independently, in some embodiments, at least one non-olefin polymer is used that is "solvent compatible" with one or more film forming polymer. Two materials are said herein to be "solvent compatible" with each other if at least one solvent can be found in which each of those two materials is soluble at 25° C. in the amount of 1 gram or more of material per 100 grams of solvent. In some embodiments, at least one non-olefin polymeris used that is solvent compatible with each film forming polymer in the composition. In some embodiments, a solvent is used in which each film forming polymer and each non-olefin polymer is, individually, soluble in that solvent at 25° C. in the amount of 1 gram or more of material per 100 grams of solvent.

In some embodiments, the ratio of the dry weight of non-olefin polymer to the sum of the dry weights of all film forming polymers is 0.01 or higher; or 0.03 or higher; or 0.1 or higher; or 0.15 or higher; or 0.2 or higher. Independently, in some embodiments, the ratio of the dry weight of non-olefin polymer to the sum of the dry weights of all film forming polymers is 0.5 or lower; or 0.4 or lower; or 0.3 or lower.

In some embodiments, the non-olefin polymer includes at least one epoxy resin. In some embodiments, the composition of the present invention does not include any significant amount (as defined herein above) of phenolic resin. In some embodiments, the composition does not include any phenolic resin. Independently, in some embodiments, the composition of the present invention does not include any significant amount of chlorinated polyolefin. In some embodiments, the composition of the present invention does not include any chlorinated polyolefin. In some embodiments, the composition of the present invention does not include any significant amount of any epoxy resin. In some embodiments, the composition of the present invention does not include any epoxy resin.

Among embodiments in which a non-olefin polymer is used, in some embodiments the non-olefin polymer includes at least one phenolic resin. Suitable phenolic resins include, for example, resorcinol type phenolic resins, novalac type phenolic resins, and mixtures thereof.

Among embodiments in which a non-olefin polymer is used, in some embodiments the non-olefin polymer includes at least one epoxy resin. Suitable epoxy resins include, for example, epoxy phenol-novolac, epoxy cresol-novolac, diglycidyl ethers of bisphenol A, triglycidyl isocyanurate resins, N, N, N',N'-tetraglycidyl,-4,4-diaminodiphenylmethane, similar resins, and mixtures thereof. In some embodiments, the composition includes one or more epoxy cresol-novolac resin.

Among embodiments in which the composition includes at least one epoxy resin, independent of the type of epoxy resin composition, the epoxy resin may usefully be characterized by its molecular weight. Some suitable epoxy resins, for example, have molecular weight of 200 or higher; or 500 or higher; or 750 or higher; or 1,000 or higher. Independently, some suitable epoxy resins, for example, have molecular weight of 5,000 or lower; or 2,500 or lower; or 2,000 or lower; or 1,500 or lower.

Among embodiments in which the composition includes at least one epoxy resin, independent of the type of epoxy resin, the epoxy resin may usefully be characterized by its epoxy value. Some suitable epoxy resins, for example, have epoxy value, in equivalents per kilogram, of 1 or higher; or 2 or higher; or 3 or higher; or 4 or higher. Independently, suitable epoxy resins, for example, have epoxy value, in equivalents per kilogram, of 8 or lower; or 7 or lower; or 6 or lower.

In some embodiments, a composition of the present invention contains one or more additional ingredients. The amount of each such ingredient is characterized by PHR, defined herein as 100 times the ratio of the dry weight of that ingredient to the sum of the dry weights of all film-forming polymers.

In some embodiments, a composition of the present invention contains one or more polymeric surfactant. One suitable polymeric surfactant is, for example, polyvinyl alcohol (PVOH). Among embodiments in which polymeric surfactant is used, some suitable amounts of polymeric surfactant are, for example, 1 PHR or more; or 2 PHR or more. Independently, among embodiments in which polymeric surfactant is used, some suitable amounts of polymeric surfactant are, for example, 10 PHR or less; or 8 PHR or less; or 6 PHR or less; or 5 PHR or less.

In some embodiments, a composition of the present invention contains one or more colloid stabilizer. Some suitable colloid stabilizers, for example, are cellulose compounds, including, for example, hydroxyethyl cellulose. Among embodiments in which colloid stabilzer is used, some suitable amounts of colloid stabilizer are, for example, 0.1 PHR or more; or 0.2 PHR or more; or 0.3 PHR or more. Independently, among embodiments in which colloid stabilizer is used, some suitable amounts of colloid stabilzer are, for example, 1 PHR or less; or 0.8 PHR or less; or 0.6 PHR or less.

In some embodiments, a composition of the present invention contains one or more nonionic surfactant. Some suitable nonionic surfactants, for example, are alkoxylates, copolymers of ethylene oxide and propylene oxide, and mixtures thereof. Among the suitable alkoxylates are, for example, ethoxylates, which have the structure

where R is an aliphatic group, an aromatic group, an aliphatic-substituted aromatic group, and aromatic-substituted aliphatic group, or a mixture thereof; and x is from 5 to 200. In some embodiments R is alkyl-substituted benzene, with the structure R1-R2-, where R1 is a linear alkyl group and R2 is an aromatic ring. One suitable nonionic surfactant is nonylphenol ethoxylate.

Among embodiments in which nonionic surfactant is used, some suitable amounts of nonionic surfactant are, for example, 3 PHR or more; or 5 PHR or more; or 8 PHR or more. Independently, among embodiments in which nonionic surfactant is used, some suitable amounts of nonionic surfactant are, for example, 30 PHR or less; or 20 PHR or less; or 15 PHR or less.

In some embodiments, a composition of the present invention contains one or more anionic surfactant. Among embodiments in which anionic surfactant is used, some suitable amounts of anionic surfactant are, for example, 3 PHR or more; or 5 PHR or more; or 8 PHR or more. Independently, among embodiments in which anionic surfactant is used, some suitable amounts of anionic surfactant are, for example, 30 PHR or less; or 20 PHR or less; or 15 PHR or less.

In some embodiments, the amount of anionic surfactant in the composition of the present invention is 0.1 PHR or less; or 0.01 PHR or less. In some embodiments, no anionic surfactant is present.

The composition of the present invention contains one or more crosslinker selected from polynitroso compounds, polynitroso precursors, or a mixture thereof. A polynitroso compound is an aromatic hydrocarbon containing at least two nitroso groups attached directly to non-adjacent nuclear carbon atoms. By "nuclear" carbon atom we mean a carbon atom that is part of an aromatic ring. Suitable aromatic compounds may have 1 to 3 aromatic nuclei, including fused aromatic nuclei. Suitable polynitroso compounds may have 2 to 6 nitroso groups attached directly to non-adjacent nuclear carbon atoms. Also included in the class of polynitroso compounds are the substituted polynitroso compounds, in which one or more hydrogen atoms attached to nuclear carbon atoms are replaced by organic or inorganic substituent groups, such as for example alkyl, alkoxy, cycloalkyl, aryl, aralkyl, alkaryl, arylamine, arylnitroso, amino, and halogen. In some embodiments, a composition of the present invention contains one or more polynitroso compound with 2 nitroso groups.

Among embodiments in which one or more polynitroso compound is used, some suitable polynitroso compounds have the chemical formula $R_m$—Ar—$(NO)_2$, where Ar is phenylene or naphthalene; R is a monovalent organic radical having 1 to 20 carbon atoms, an amino group, or a halogen; and m is 0, 1, 2, 3, or 4. If m is greater than 1, the m R groups may be the same or different from each other. R is, in some embodiments, an alkyl, cycloalkyl, aryl, aralkyl, alkaryl, arylamine, or alkoxy radical with 1 to 20 carbon atoms; or R is, in some embodiments, an alkyl group with 1 to 8 carbon atoms. Independently, in some embodiments, the value of m is zero.

Some examples of suitable polynitroso compounds are m-dinitrosobenzene; p-dinitrosobenzene; m-dinitrosonaphthalene; p-dinitrosonaphthalene; 2,5-dinitroso-p-cymene; 2-methyl-1,4-dinitrosobenzene; 2-methyl-5-chloro-1,4-dinitrosobenzene; 2-fluoro-1,4-dinitrosobenzene; 2-methoxy-1, 3-dinitrosobenzene; 2-benzyl-1,4-dinitrosobenzene; 2-cyclohexyl-1,4,-dinitrosobenzene; and mixtures thereof. In some embodiments, one or more polynitroso compound is used that is selected from dinitrosobenzenes, substituted dinitrosobenzenes, dinitrosonaphthalenes, substituted dinitrosonaphthalenes, and mixtures thereof.

Also included in the class of polynitroso compounds are compounds as described above which exist in polymeric form, as described in Czerwinski, U.S. Pat. No. 4,308,365, and Hargis et. al., U.S. Pat. No. 5,478,654. In some embodiments, one or more polynitroso compound is used that is selected from the polymeric form of p-dinitrosobenzene, the polymeric form of 1,4-dinitrosonaphthalene, and mixtures thereof. In some embodiments, the polymeric form of 1,4-dinitrosobenzene is used.

In some embodiments, every polynitroso compound present in the adhesive composition is selected from the polymeric form of p-dinitrosobenzene, the polymeric form of 1,4-dinitrosonaphthalene, and mixtures thereof. In some embodiments, every polynitroso compound present in the adhesive composition is the polymeric form of p-dinitrosobenzene.

A polynitroso precursor is a compound that is capable of a chemical reaction, at least one product of which is a polynitroso compound. Some suitable polynitroso precursors are, for example, compounds that have the structure of compounds that could be made by reduction of any of the polynitroso compounds described herein above. Some suitable precursors are, for example, substituted p-quinone dioximes, p-quinone dioxime, and mixtures thereof.

In some embodiments, the adhesive composition contains no significant amount of any polynitroso compound. In some embodiments, the adhesive composition contains no polynitroso compound.

In some embodiments, the adhesive composition contains no significant amount of any polynitroso precursor. In some embodiments, the adhesive composition contains no polynitroso precursor.

In some embodiments, the amount of crosslinker may be, for example, 0.5 PHR or more; or 1 PHR or more; or 1.5 PHR or more. Independently, in some embodiments, the amount of polynitroso compound may be, for example, 40 PHR or less; or 15 PHR or less; or 10 PHR or less; or 5 PHR or less; or 2.5 PHR or less.

In some embodiments, a composition of the present invention contains one or more anti-corrosion pigment. Some suitable anti-corrosion pigments are, for example, lead oxide, zinc oxide, molybdate modified zinc oxide, other anti-corrosion pigments, and mixturese thereof. In some embodiments, no anti-corrosion pigment is used. In embodiments in which an anti-corrosion pigment is present, the amount of anti-corrosion pigment may be, for example, 2 PHR or more; or 5 PHR or more; or 8 PHR or more. Independently, in embodiments in which an anti-corrosion pigment is present, the amount of anti-corrosion pigment may be, for example, 20 PHR or less; or 15 PHR or less; or 12 PHR or less.

In some embodiments, a composition of the present invention contains clay. In some embodiments, no clay is used. In embodiments in which clay is present, the amount of clay may be, for example, 2 PHR or more; or 5 PHR or more; or 8 PHR or more. Independently, in embodiments in which clay is present, the amount of clay may be, for example, 20 PHR or less; or 15 PHR or less; or 12 PHR or less.

In some embodiments, a composition of the present invention contains carbon black. In some embodiments, no carbon black is used. In embodiments in which carbon black is present, the amount of carbon black may be, for example, 2 PHR or more; or 5 PHR or more; or 8 PHR or more. Independently, in embodiments in which carbon black is present, the amount of carbon black may be, for example, 20 PHR or less; or 15 PHR or less; or 12 PHR or less.

The composition of the present invention includes at least one oxidizer. An oxidizer is a compound that readily does one or more of the following: gives up oxygen, removes hydrogen from another compound, or attracts electrons to acquire a negative charge. Oxidizers are also known as oxidizing agents. Some suitable oxidizers include, for example compounds with electrical potential of 1.1 volt or higher; or 1.2 volt or higher; or 1.3 volt or higher. Independently, in some embodiments, the adhesive composition contains at least one polynitroso precursor and at least one oxidizer that are capable of reacting with each other to form at least one polynitroso compound. Independently, in some embodiments, the adhesive composition contains at least one polynitroso compound that has the structure of the oxidized form of a particular polynitroso precursor, and the adhesive composition also contains at least one oxidizer that is capable of oxidizing that polynitroso precursor to form that polynitroso compound. Independently, in some embodiments, the adhesive composition contains at least one polymeric polynitroso compound, and at least one monomeric unit of that polymeric polynitroso compound is a polynitroso compound that has the structure of the oxidized form of a particular polynitroso precursor, and the adhesive composition also contains at least one oxidizer that is capable of oxidizing that polynitroso precursor to form that polynitroso compound. One suitable oxidizer is manganese dioxide.

Among embodiments in which manganese dioxide is used, some suitable forms of manganese dioxide include, for example, precipitated amorphous manganese dioxide, manganese dioxide co-precipitated with another material (such as, for example, silica, carbon black, or mixture thereof), or mixtures thereof.

In some embodiments, the mole ratio of oxidizer to crosslinker is 0.3 or greater; or 0.75 or greater; or 1.0 or greater. Independently, in some embodiments, the mole ratio of oxidizer to crosslinker is 5 or less; or 2 or less; or 1.5 or less.

In some embodiments, a composition of the present invention contains one or more dispersant. Dispersants, as used herein, include, for example, polymeric surfactants, polymeric colloid stabilizers, dispersants normally used dispersing for mineral pigments, anionic surfactants, nonionic surfactants, and mixtures thereof. In some embodiments, no dispersant is used. In some embodiments in which one or more dispersant is used, the amount of dispersant may be, for example, 0.5 PHR or more; or 1.0 PHR or more; or 1.5 PHR or more. Independently, in some embodiments in which one or more dispersant is used, the amount of dispersant may be, for example, 10 PHR or less; or 5 PHR or less; or 2.5 PHR or less.

In some embodiments, a composition of the present invention contains one or more amine. In some embodiments in which one or more amine is used, the amount of amine may be, for example, 0.1 PHR or more; or 0.2 PHR or more; or 0.5 PHR or more. Independently, in some embodiments in which one or more amine is used, the amount of amine may be, for example, 4 PHR or less; or 3 PHR or less; or 2 PHR or less.

In embodiments in which the composition of the present invention is waterborne, the waterborne composition may be prepared by any method. Some suitable methods, for example, involve use of a solution in organic solvent. That is, a solution in an organic solvent may be made that contains any one of, or any combination of two or more of, any film forming polymers and any other polymers to be used in the composition. In some embodiments, the organic solvent is not miscible with water. Independently, in some embodiments, a solvent is used that has boiling point less than 100° C. Some suitable organic solvents, for example, are aromatic and substituted aromatic compounds that are liquid at 25° C., including, for example, alkyl aromatic compounds such as, for example, benzene, toluene, or xylene.

In some embodiments that use a solution in organic solvent of one or more polymers, such a solution is converted to a latex by a process of emulsification. The latex may, for example, then have organic solvent removed, for example by vacuum stripping. A dispersion that contains discrete particles of at least one polymer dispersed in water is known herein as a latex.

Forming the composition of the present invention may, for example, involve mixing a latex with one or more of the following: one or more polynitroso compound or polynitroso precursor, one or more anti-corrosion pigment, clay, carbon black, manganese dioxide, amine, or any mixture of some or all thereof.

In some embodiments, the composition of the present invention does not contain any significant amount (as defined herein above) of any polyisocyanate. A polyisocyanate is a compound having two or more isocyanate groups. In some embodiments, the composition of the present invention does not contain any significant amount of any isocyanate compound. In some embodiments, the composition of the present invention does not contain any polyisocyanate. In some embodiments, the composition of the present invention does not contain any isocyanate compound.

In some embodiments, the adhesive composition of the present invention is used to bond two or more substrates together. For example, a layer of the adhesive composition may be applied to a first substrate. In some embodiments, the layer of adhesive composition may optionally be dried before the layer of adhesive composition is brought into contact with any additional substrate. In some embodiments, at least one additional substrate is brought into contact with the layer of adhesive composition.

In some embodiments, a first substrate is used that as metal. One suitable metal is steel. In some of such embodiments, a layer of adhesive composition is applied to the metal and then dried. Among such embodiments, a primer may or may not be applied to the metal and dried. If primer is used, a layer the adhesive composition is applied to the primer layer and then dried. Drying of the adhesive layer may, optionally, performed at temperature above 25° C. In some embodiments, a layer of an uncured rubber formulation (including green rubber, crosslinking chemicals, and, optionally, other ingredients) is then applied to the layer of (optionally dried) adhesive composition. The article thus formed, in some embodiments, is then heated above 125° C. to cure the rubber formulation.

While the present invention is not limited to any particular mechanism, it is contemplated that, in some embodiments, some compositions behave in the following manner. In some embodiments, a polymeric polynitroso compound is used. In some of such embodiments, the adhesive composition is in contact with uncured rubber and is heated to 125° C. or higher, and the rubber is cured by exposure to that temperature. In such embodiments, it is contemplated that the polymeric polynitroso compound interacts with double bonds on one or more polymers in the adhesive composition, on the rubber molecules, or on both. In such embodiments, it is contemplated that one product of the cure process is one or more crosslinks that link an unsaturated site on one polymer chain (either in the adhesive or in the rubber) to at least one unsaturated site on at least one other polymer chain (independently, either in the adhesive or in the rubber). It is contemplated that such crosslinks are residues of monomeric polynitroso compound derived from the polymeric polynitroso compound. It is further contemplated that another product of the cure process is one or more molecules of polynitroso precursor. It is contemplated that such polynitroso precursors could react with oxidizer in the composition to form polynitroso compound, which in turn could form more crosslinks.

In some embodiments, a layer of adhesive composition is applied to a metal substrate and dried. In some of such embodiments, the metal substrate and the dried adhesive composition are prebaked (i.e., heated to the temperature that is appropriate for curing a particular rubber formulation). Then, after the metal substrate and the dried adhesive composition are held at that temperature for a time, a layer of that particular uncured rubber formulation is applied to the layer of dried adhesive formulation, and the article thus formed is held at that temperature for a time sufficient to cure the rubber formulation.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. As a further, independent, example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

EXAMPLES

Example 1

Latex

Ingredients used in making a latex:

| Ingredient | Vendor and Tradename | Latex 1A Amount | Latex 1B-C Amount |
|---|---|---|---|
| Polyvinyl Alcohol (PVOH) CAS#25213-24-5 | Celanese-Celvol ™ 540 | 0.5% | 0.5% |
| Hydroxyethyl Cellulose (HEC) CAS#9004-62-0 | Dow Chemical Co. Cellosize ™ QP-100-M | 0.08% | 0.08% |
| Ethoxylated Nonyl Phenol (ENP) CAS#68649-55-8 | Rhodia - Abex ™ 100 and Abex ™ 120 | 0.55% 1.25% | 0.55% 1.25% |
| Anionic Surfactant | Lanxess-Protowet ™ D-75 | 0.17% | 0.17% |
| BPDCD | Rohm and Haas Company | 10.9% | zero |
| CSM (Chlorosulfonated polyethylene) | Dupont - Hypalon ™ 40 | 2.6% | 6.02% |
| EPOXY Resin | Ciba-Giegy-Ardalite ™ 1299 | 3.3% | zero |
| Chlorinated Polyethylene (CPE) | Nippon Paper-Superchlon ™ HE-1200 | zero | 9.06% |
| Xylene | commodity | 23.9% | 23.9% |
| Water | commodity | 56.9% | 5.4% |

Polymer latex was made as follows:

a. BPDCD (40% by weight solution in Xylene) was charged into the vessel to be used to make emulsion, and the agitator was started b. With agitation, solid CSM polymer and compatibilizing polymer (in solid or liquid form, not in solution) were added and mixed at room temperature until all polymers were dissolved c. Agitation was increased to maximum for the equipment used (If Cowles mixer was used, agitation was above 3500 rpm; if a mixer emulsifier or a rotor stator was used, agitation was above 5000 rpm; no different effects were observed from using different equipment) Surfactants and colloidal stabilizing materials (the first 4 ingredients in the above list) were added to polymer solution, allowing any solid surfactants to dissolve before proceeding to next material.

d. Once all surfactants were charged and the solution was homogeneous, water was added slowly so that it was added over 60-70 minutes. Once the inversion point was reached, the water addition rate was increased. The inversion point is the point where the viscosity of the emulsion has reached a maximum with a consistency of a thick paste, and additional water, when added rapidly, reduces the viscosity. This is the point at which the emulsion goes from a water in oil emulsion to a oil in water emulsion.

e. Once all of the water was added, the batch was transferred to a stripping vessel, and the batch was then heated to 70-80° C.

f. Once batch reached the desired temperature, the pressure in the vessel was reduced to remove solvent.

Note: for emulsion 1B-C, the CSM and CPE were charged to the solvent and allowed to dissolve, and the process proceeded as described above.

Example 2

Adhesive Compositions

| | | Dry Weight Percent | | | |
|---|---|---|---|---|---|
| Ingredients | Supplier | Example 2A | Example 2B-C | Example 2C | Example 2D-C |
| Latex 1A | Example 1 | 56.85 | 66.27 | 0 | 0 |
| Latex 1B-C | Example 1 | 0 | 0 | 56.85 | 66.27 |
| polymeric dinitrosobenzene | commodity | 9.95 | 11.60 | 9.95 | 11.60 |
| Carbon Black - Raven ™ H₂O | Columbian Chemical Company | 5.69 | 6.63 | 5.69 | 6.63 |
| Clay - Polyplate ™ HMT | Huber | 10.00 | 6.63 | 10.0 | 6.63 |
| Molywhite 101 | Dupont | 5.69 | 6.63 | 5.69 | 6.63 |
| Dispersants* | | 1.93 | 2.25 | 1.93 | 2.25 |

-continued

| Ingredients | Supplier | Dry Weight Percent | | | |
|---|---|---|---|---|---|
| | | Example 2A | Example 2B-C | Example 2C | Example 2D-C |
| Starfactant™ 20 polymeric Dispersant | Cognis | 0.85 | 0.99 | 0.85 | 0.99 |
| EFKA™ 4580 Acrylic based Dispersant | EFKA | 0.85 | 0.99 | 0.85 | 0.99 |
| Marasperse™ CBOS-3 lignosulfonate dispersant | Lignotech | 0.23 | 0.27 | 0.23 | 0.27 |
| Manganese Dioxide | Kerr McGee | 25.00 | 0 | 25.00 | 0 |

Example 3

Testing of Adhesive Formulations

Adhesive formulations were tested using the tensile button test ("button" herein) (ASTM D-429A), the 90-degree peel test ("peel" herein) (ASTM D-429B), and the prebake test (also ASTM D-429B). For the 90-degree peel test and the tensile button test, steel bars were cleaned and grit blasted, then primed with Robond™ TR-100 (Rohm and Haas Co.), then coated with adhesive formulation by spray to thickness of 0.0102 mm to 0.0152 mm (0.0004 inch to 0.0006 inch). The adhesive layer was dried at 70° C. for 10 minutes. Then a rubber layer was applied and cured as follows:

| Rubber type | cure |
|---|---|
| sulfur cured SBR ("R1") | 20 minutes at 170° C. (338° F.) |
| high sulfur NR ("R2") | 20 minutes at 170° C. (338° F.) |
| semi EV NR ("R3") | 10 minutes at 160° C. (320° F.) |

Test results were as follows:

| rubber layer | Test | Adhesive Formulation Sample No. | | | |
|---|---|---|---|---|---|
| | | 2A | 2B-C | 2C | 2D-C |
| R1 | peel, in kgf/mm (lbf/inch) | 2.16 (121) | 1.98 (111) | 0.10 (5.9) | 0.66 (37) |
| R1 | prebake, kgf/mm (lbf/inch) | 0.86 (48) | 0.75 (42) | 0.82 (46) | 0.71 (40) |
| R1 | Button, in MPa (psi) | 9.06 (1314) | 9.20 (1334) | 1.23 (178) | 4.61 (668) |
| R2 | peel, in kgf/mm (lbf/inch) | 2.29 (128) | 1.57 (88) | 0.50 (28) | 0.50 (28) |
| R2 | prebake, kgf/mm (lbf/inch) | 1.84 (103) | 1.79 (100) | 0.93 (52) | 0.39 (22) |
| R2 | button, in MPa (psi) | 9.62 (1395) | 10.37 (1504) | 3.54 (513) | 4.93 (715) |
| R3 | peel, in kgf/mm (lbf/inch) | 0.98 (55) | 1.07 (60) | 0.70 (39) | 0.42 (23.4) |
| R3 | prebake, kgf/mm (lbf/inch) | 0.12 (7) | 0.12 (7) | 0.52 (29) | 0.16 (9) |
| R3 | button, in MPa (psi) | 8.69 (1261) | 8.08 (1172) | 5.46 (792) | 4.45 (645) |

Sample 2A and Comparative Sample 2B-C are similar except that Comparative Sample 2B-C lacks oxidizer and has higher level of polymeric dinitrosobenzene. When these two samples are compared, 2A and 2B-C have comparable results despite 2A having a reduced level of polymeric dinitrosobenzene.

Similarly, Sample 2C and Comparative Sample 2D-C are similar except that Comparative Sample 2D-C lacks oxidizer and has higher level of polymeric dinitrosobenzene. When these two samples are compared, 2C and Comparative Sample 2D-C have similar results, despite the reduced level of polymeric dinitrosobenzene. In some cases 2C actually has some improved performance especially in prebake properties.

We claim:
1. A waterborne adhesive composition comprising
   (i) at least one film forming polymer,
   (ii) at least one crosslinker selected from the group consisting of polynitroso compounds, and
   (iii) at least one oxidizer, wherein the molar ratio of oxidizer to crosslinker is from 0.3 to 2.0,
   wherein said oxidizer comprises manganese dioxide
   wherein said film forming polymer is selected from halogenated polyolefins, halosulfonated polyolefins, and mixtures thereof.
2. The composition of claim 1, wherein said composition does not contain any significant amount of any polyisocyanate.
3. The adhesive composition of claim 1, wherein said crosslinker comprises polymeric dinitrosobenzene.
4. The composition of claim 1, wherein said composition comprises no significant amount of any polynitroso precursor.
5. The composition of claim 4, wherein said composition comprises no polynitroso precursor.
6. The composition of claim 3, wherein said composition comprises no significant amount of any polynitroso precursor.
7. The composition of claim 6, wherein said composition comprises no polynitroso precursor.
8. The composition of claim 1, wherein the amount of said crosslinker is 0.5 PHR or more, wherein said amount in PHR is calculated as 100 times the ratio of the dry weight of said crosslinker to the sum of the dry weights of all film-forming polymers in said composition.
9. The composition of claim 1, wherein the amount of said crosslinker is 1 PHR or more, wherein said amount in PHR is calculated as 100 times the ratio of the dry weight of said crosslinker to the sum of the dry weights of all film-forming polymers in said composition.
10. The composition of claim 1, wherein the amount of said crosslinker is 1.5 PHR or more, wherein said amount in PHR is calculated as 100 times the ratio of the dry weight of said crosslinker to the sum of the dry weights of all film-forming polymers in said composition.
11. The composition of claim 4, wherein the amount of said crosslinker is 0.5 PHR or more, wherein said amount in PHR is calculated as 100 times the ratio of the dry weight of said crosslinker to the sum of the dry weights of all film-forming polymers in said composition.

12. The composition of claim 4, wherein the amount of said crosslinker is 1 PHR or more, wherein said amount in PHR is calculated as 100 times the ratio of the dry weight of said crosslinker to the sum of the dry weights of all film-forming polymers in said composition.

13. The composition of claim 4, wherein the amount of said crosslinker is 1.5 PHR or more, wherein said amount in PHR is calculated as 100 times the ratio of the dry weight of said crosslinker to the sum of the dry weights of all film-forming polymers in said composition.

14. The composition of claim 1, wherein said halogenated polyolefins comprise chlorinated polyethylene or brominated polydichlorobutadiene or a mixture thereof, and wherein said halosulfonated polyolefins comprise chlorosulfonated polyethylene.

15. The composition of claim 1, wherein said at least one film forming polymer is a mixture of one or more halogenated polyolefins and one or more halosulfonated polyolefins.

16. The composition of claim 15, wherein said halogenated polyolefins comprise chlorinated polyethylene or brominated polydichlorobutadiene or a mixture thereof, and wherein said halosulfonated polyolefins comprise chlorosulfonated polyethylene.

\* \* \* \* \*